May 8, 1951 L. B. FORMAN 2,551,835
POWER TRANSMISSION
Filed Sept. 10, 1945 2 Sheets-Sheet 1

INVENTOR.
Louis B. Forman.
BY
Harness & Harris
ATTORNEYS.

May 8, 1951 L. B. FORMAN 2,551,835
POWER TRANSMISSION
Filed Sept. 10, 1945 2 Sheets-Sheet 2

INVENTOR.
Louis B. Forman.
BY
Harness & Harris
ATTORNEYS.

Patented May 8, 1951

2,551,835

UNITED STATES PATENT OFFICE 2,551,835

POWER TRANSMISSION

Louis B. Forman, Detroit, Mich., assignor to Chrysler Corporation, Highland Park, Mich., a corporation of Delaware Application September 10, 1945, Serial No. 615,458

22 Claims. (Cl. 74—472)

This invention relates to motor vehicles and refers more particularly to power transmission and control mechanism therefor.

My invention has particular reference to transmission systems in which the torque load is relieved as by momentary interruption of the engine ignition system in order to unload positively engageable drive control elements so as to facilitate disengagement of such elements. One example of such a transmission is described and claimed in the copending application of Carl A. Neracher et al., Serial No. 335,310, filed May 15, 1940, now issued as Patent No. 2,455,943 on December 14, 1948. In such transmission systems it is now customary to provide a kickdown control on transmission downshift accompanied by ignition interruption such that when the accelerator pedal is depressed to the limit of its travel in throttle-opening direction then the downshift will automatically take place so as to accelerate the vehicle in a more favorable drive ratio as in passing another vehicle or in climbing a steep grade. It is also customary to provide a vehicle speed responsive control on both upshift and downshift in the transmission. The upshift control sets the transmission for a faster drive or step-up to occur at or above a predetermined vehicle speed and the vehicle speed responsive control on transmission downshift is accompanied by ignition interruption such that when the vehicle is brought to a temporary stop the transmission will be automatically stepped-down and thus be set for acceleration from rest, known as "break-away," in a favorable torque multiplying gear ratio.

One difficulty which is experienced with such prior transmission systems lies in the circumstance that the arrangement frequently gives rise to stalling the engine especially where the drive system incorporates a fluid coupling. This is brought about by the heretofore recognized necessity to set the governor so as to call for downshift in the transmission at a vehicle speed corresponding approximately to engine idling speed or therebelow and at such low engine speeds there is a tendency for the engine to fail to recover after the ignition is momentarily interrupted and to give rise to objectionable jolt or lurching incident to the downshift operation.

When the vehicle is coasting to a stop with the accelerator pedal released and the brakes applied, it is apparent that the engine is lagging or exerting a drag on the vehicle so that the positively engageable transmission drive control elements to be released for downshift are under coast torque. If, as is customary, the ignition is interrupted at such time then this results in imposing still more coasting torque on the drive control elements which renders their relative releasing movement more difficult rather than being facilitated. For this reason it is customary in such prior systems to set the governor for downshift control at a relatively low car speed so that with the attendant ignition interruption the drive control elements will not be substantially additionally loaded by coast torque and may in fact bring about a reversal in the direction of torque as where the ignition interruption occurs just below the speed at which the engine will idle freely. In the latter instance at the moment when the governor calls for downshift the engine is endeavoring to come up in speed to its free idling condition thus imposing slight drive torque at the drive control elements so that ignition interruption at such time will change the drive torque to coast torque and thus facilitate relative disengagement of the drive control elements. Obviously, however, for such relationship to exist the downshift must be set to occur at very low vehicle speeds, such as around ten miles per hour, by way of example, when coasting to a stop in the normal cruising gear ratio and not only does the engine tend to stall and fail to recover upon restoration of the igniation after the interruption but, in addition, such downshift setting is objectionably low in car speed.

Ignition interruption as an incident to transmission downshift when bringing the vehicle to rest has been heretofore deemed to be necessary for the further reason that during cold weather and at other times before the engine comes up to certain temperature, automatic throttle controls generally commercially in use provide what is known as a "fast idle." This in effect keeps the engine throttle part way open even when the accelerator is released to insure against engine stalling. During such conditions I have successfully effected downshifts without torque relief but it is in many instances desirable to provide torque relief, such as ignition interruption, for the speed responsive downshift and this is beneficial at such times because the fast idle imposes drive torque on the drive control elements with the result that the ignition interruption then operates to unload the torque and is of material benefit, although by no means an essential control, in bringing about the disengagement of the drive control elements. Whether my cut-in and cut-out of torque relief, as a function of fast idle and normal idle of the engine, is to be used is often a matter of the degree or amount of fast idle provided, the inertia of the downshift transmission mechanism, the power employed for downshift in relation to torque at the transmission drive control elements, and the desired smoothness of downshift. However, as soon as the engine has warmed up sufficiently to allow the throttle to move or to approximately to its limit of closing movement, then the ignition interruption when cut-in for downshifts under fast idle engine conditions and when employed only for accelerator kickdown conditions is, according to my invention, dispensed with insofar as speed responsive downshifts are concerned.

It is often desired to provide for automatic downshift at a car speed higher than that heretofore commercially employed so that on turning a corner the downshift will automatically occur for quicker acceleration thereafter and usually this cornering is done at somewhat higher car speeds than that at which the downshift has been heretofore set to occur. Furthermore, ordinary traffic conditions are such that from the standpoint of the vehicle driver it is preferred to have the downshift occur at a car speed in excess of ten miles per hour such as around 13 or 14 miles per hour or even higher in the cruising gear as this would automatically set the transmission for good "pick-up" after slowing down.

It is an object of my invention to provide a vehicle speed responsive downshift of the transmission operating automatically at predetermined vehicle speed without tending to stall the engine and capable of being set to operate at a relatively higher vehicle speed than has been deemed to be possible with control systems of the general type hereinbefore referred to, and capable, when desired, of being set to operate at relatively low vehicle speeds in keeping with prior practice but without tendency to stall the engine.

Another object of my invention is to provide a transmission system having improved speed responsive downshift operating automatically to at times cut-in and at times cut-out operation of a torque unloading means, such as momentary interruption of the ignition system, depending on predetermined conditions of motor vehicle operation but without tendency to stall the engine.

A further object is to provide an improved transmission control wherein the torque unloading means is operable to accompany accelerator kickdown or other driver kickdown or downshift of the transmission at relatively high vehicle speeds even when the engine throttle valve is substantially fully open, in conjunction with a control system automatically operating to selectively render the torque unloading means either operable or inoperable when the vehicle speed responsive means calls for or directs the downshift.

Another object is to provide an improved control on the operation of an ignition interrupting system responsive automatically to engine throttle position, such control being effective to facilitate transmission downshift under varying conditions of operation of the vehicle.

A still further object is to provide an improved transmission downshift control which will operate smoothly and quietly without attendant jolt or lurching of the car or its occupants.

Further objects and advantages of my invention will be more apparent from the following illustrative embodiments, reference being had to the accompanying drawings, in which.

Figure 1:
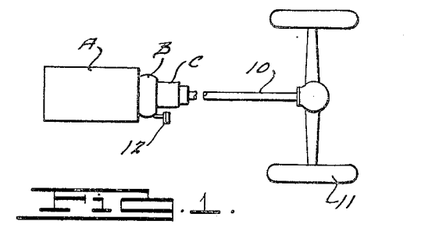
Fig. 1 is a diagrammatic top plan view of my power transmission applied to a motor vehicle.

In Fig. 1 the motor vehicle is of any desired type, that illustrated being of standard practice wherein an engine A transmits its drive through a propeller shaft 10 to drive the rear ground wheels 11. A fluid coupling and main friction clutch of known type and as illustrated in said copending application may be provided within the housing B, the clutch being releasable to uncouple the engine from the transmission by a conventional clutch pedal 12. Rearwardly of housing B is the transmission C of any type incorporating positively engageable drive control elements which resist relative disengagement when under substantial torque load thereby making the use of some form of torque unloading means desirable as an incident to transmission stepdown by release of the torque loaded drive control elements.

Figure 2:
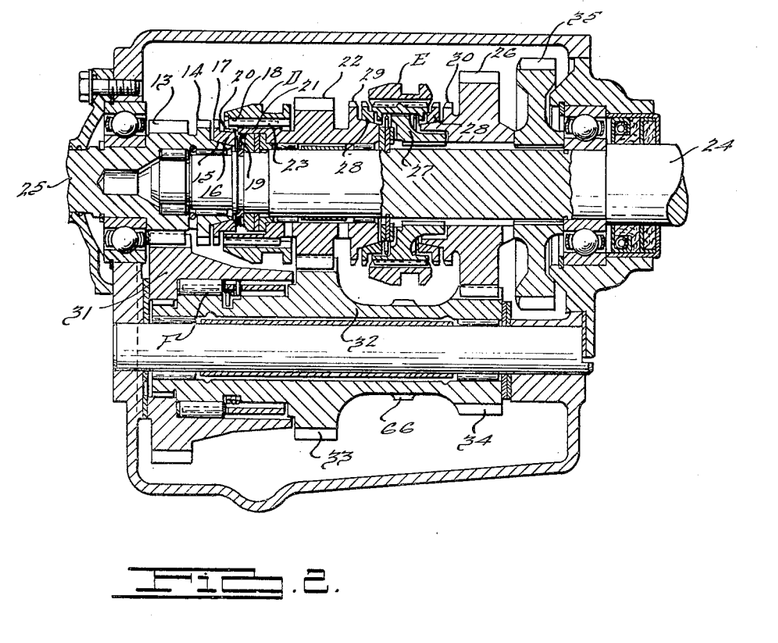
Fig. 2 is a sectional elevational view of a typical transmission to which my invention is applied for illustrative purposes.

The illustrated transmission C is that more fully shown in said copending application and is of the underdrive type although other types including overdrive transmissions of known commercial form may be employed if desired. This transmission C comprises an input pinion 13 carrying clutch teeth 14 and a friction cone 15 constantly engaged by a blocker 16 carrying blocker teeth 17 adapted to be engaged by the teeth 18 of a clutch sleeve D when the latter is biased forwardly under asynchronous conditions in the rotation of pinion 13 and sleeve D. This sleeve together with clutch teeth 14 comprise relatively movable drive control elements for effecting step-ups and step-down manipulation of the transmission.

Blocker 16 is lightly urged against the cone 15 by a spring 19 and has a lost-motion connection at 20 with the slotted end of a hub 21 of a high speed gear 22 such that the blocker may move relative to sleeve D between two positions blocking the sleeve, such positions being known as drive block and coast block depending on whether pinion 13 appreciably leads or lags the speed of the sleeve. The sleeve D is splined on hub 21 at 23, the arrangement being such that whenever sleeve D is rotating faster or slower than pinion 13 then the blocker teeth 17 will be aligned with the ends of the teeth of sleeve D and thus prevent shift of the sleeve into contact with teeth 14. However, when the pinion 13 is rotating faster than sleeve D and gear 22 and the sleeve is biased forwardly into blocked position, the driver may release the accelerator pedal to cause the engine and pinion 13 to slow down and as the pinion and sleeve pass through a synchronous relationship the blocker is moved from its drive blocking position toward its coast blocking position and when mid-way will unblock the sleeve and allow teeth 18 to pass between the blocker teeth and clutch with teeth 14.

Gear 22 is loose on the output shaft 24 whereas pinion 13 is a part of the input shaft 25. Loose on the output shaft is a low speed gear 26 and a manually shiftable clutch E, which has a splined connection with a hub 27 fixed to shaft 24, has associated therewith any commercial type of blocker synchronizers 28 such that clutch E may be shifted either forwardly to high range or rearwardly to low range to synchronously clutch shaft 24 either with the high speed gear 22 at the teeth 29 or with the low speed gear 26 at the teeth 30. Manual shifts of clutch E are facilitated by release of the main clutch at B by reason of the usual clutch pedal 12.

Pinion 13 has constant mesh with a countershaft gear 31 operating through an overrunning clutch F to drive the countershaft cluster 32 comprising gears 33 and 34 respectively in constant mesh with gears 22 and 26. For reverse an idler gear (not shown) having constant mesh with gear 34 is shifted rearwardly to mesh with gear 35 fixed on shaft 24, clutch E being maintained in its illustrated neutral condition.

When clutch E is shifted rearward to clutch gear 26 to shaft 24 then an overrunning relatively slow speed low range drive or first speed is transmitted from shaft 25 to shaft 24 by way of gear 31, overrunning clutch F, and gears 34 and 26. If at such time sleeve D is biased forward into drive block condition and the shaft 25 allowed to coast down by overrunning release of clutch F, then when teeth 14 are thus synchronized with sleeve D the latter, as aforesaid, will be unblocked and will clutch with teeth 14 to effect a step-up in the transmission during coasting conditions so that now a two-way relatively fast speed low range drive or second speed is effected from shaft 25 through sleeve D to gear 22 thence by way of gears 33, 34, and 26 and through clutch E to shift 24, clutch F overrunning.

If clutch E is shifted forwardly to clutch gear 22 to shaft 24 then an overrunning relatively slow speed high range drive or third speed is transmitted from shaft 25 to shaft 24 by way of gear 31, overrunning clutch F, gears 33 and 22 thence through clutch E to shaft 24. In the same manner as aforesaid in connection with step-up from first to second, sleeve D may be clutched under coast synchronous conditions with teeth 14 to effect a two-way relatively fast speed high range drive or direct fourth of a speed ratio of 1 to 1 from shaft 25 directly through sleeve D and clutch E to shaft 24, clutch F overrunning.

Speed responsive means is provided to control forward bias of sleeve D as well as rearward bias thereof as will presently be more apparent. Furthermore, during drive in either second or fourth, a downshift to first or third respectively may be effected under control of the driver preferably by a full depression of the accelerator.

Figure 3:
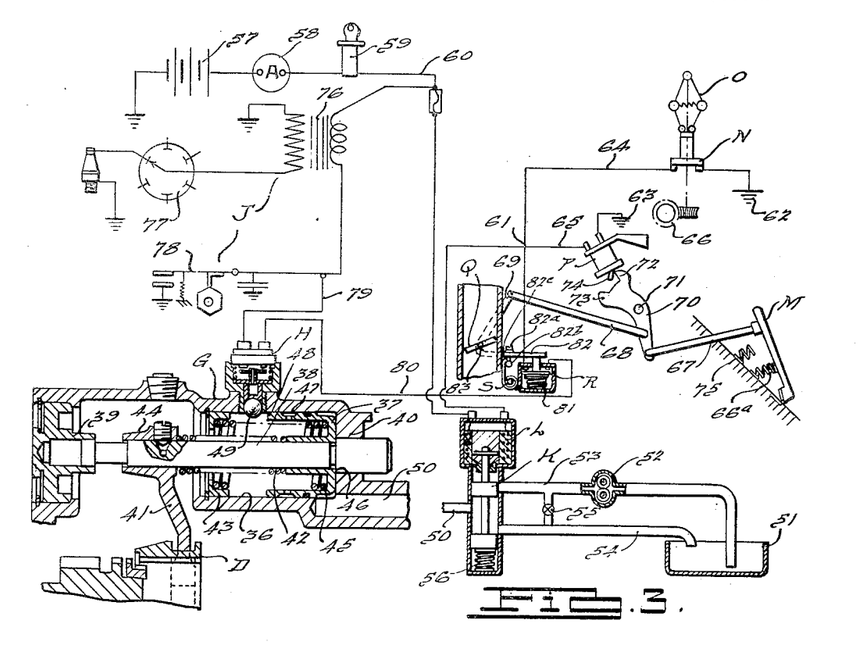
Fig. 3 is a diagrammatic view illustrating my control system.

Referring now to Fig. 3 I have illustrated servo means in the form of a fluid motor G for controlling shift of sleeve D, this motor comprising a cylinder 36 slidably receiving a piston 37 which slidably receives a rod 38 which is mounted to reciprocate in the guideways 33, 40. Fixed to this rod is the collar 44 of a yoke 41 connected with sleeve D to effect shift thereof. A relatively small force pre-loaded engaging spring 42 is disposed between piston 37 and yoke 41 to provide a lost-motion thrust transmitting connection such that piston 37 may move forwardly or to the left for its power stroke limited by abutment 43 in advance of the full clutching shift of sleeve D limited by engagement of the yoke collar 44 with the rear end of guideway 39. A relatively large force pre-loaded kickdown spring 45 is disposed between abutment 43 and piston 37 and serves to return the piston and sleeve D to the Fig. 3 position. The spring 45 is thus adapted to effect disengaging bias of sleeve D relative to teeth 14.

Rod 38 has a shoulder 46 which in Fig. 3 engages the face of piston 37 but which, when the piston and rod 38 are moved to the end of their forward strokes, is spaced rearwardly of the piston to provide a gap equal to the difference in the strokes of the piston and rod. This gap is utilized to close an ignition control switch H for interrupting the engine ignition system J. Piston 37 is provided with an annular groove 47 formed in its skirt to define the cam portion 48 which operates the ball actuator 49 for closing switch H.

The pressure fluid supply system has been diagrammatically represented in Fig. 3 and comprises a suitable supply 51 of oil which is usually at the transmission sump. A pump 52, preferably driven by the transmission output shaft 24, draws the oil from the supply 51 for delivery under pressure through pipe 53 thence to the passage 50 under control of a valve K when raised to establish communication between pipe 53 and passage 50 and at the same time close off the Fig. 3 communication of passage 50 with the return drain pipe 54. A pressure relief valve 55 by-passes the valve K so that when valve K is in its Fig. 3 venting position for the motor G, the pressure fluid delivered by the pump is returned to the supply 51 and also functioning to maintain a predetermined desired pressure in the passage 50 when the valve is raised by its spring 56.

In Fig. 3 the valve K is shown lowered by operation of a solenoid L which is electrically energized to lower the valve against the force of the return spring 56 and to maintain the valve in such position.

Energization and de-energization of solenoid L is brought about by operation from one position to another of either of two control members respectively actuated or controlled by vehicle speed and by the driver. Electrical circuit means for this purpose includes a grounded storage battery 57 for supply of electrical energy through ammeter 58 and ignition switch 59 to a wire 60 thence through solenoid L to a terminal 61 whence either of two parallel grounds 62 or 63 will complete a circuit to energize solenoid L through wires 64 or 65 respectively. In Fig. 3 the solenoid is energized by the circuit, which grounds the terminal 61 through wire 64 at 62 through a closed governor switch N.

This governor switch N constitutes one of the two aforesaid control members for solenoid L and is opened at predetermined vehicle speed under control of a governor O driven at 66 at some suitable point which operates at a speed proportionate to vehicle speed such as at the transmission countershaft or from driven shaft 24 if desired.

The other parallel circuit for grounding terminal 61 at 63 is controlled by a kickdown switch P which is open in Fig. 3 as accelerator M is released under control of its return spring 66ª. The accelerator thus constitutes the other of the two aforesaid control members for solenoid L and is suitably connected by well known means with the usual engine carburetor throttle valve Q by linkage 67, 68 which serves to adjust the throttle lever 69 and thus open and close the throttle valve. In Fig. 3 the throttle valve Q is closed for normal engine idling. Interposed in the throttle operating linkage is a lever 70 pivotally supported at 71 and having spaced fingers 72, 73 for operating the switch finger 74 of the snap-type of switch P. The arrangement is such that as the throttle valve approaches its wide open position by depressing accelerator M, finger 73 is engaged with switch finger 74 so that switch P is closed with snap action during approximately the last 5° or so of throttle opening movement.

If desired a pick-up spring 75 may be located at a suitable point in the throttle operating mechanism such that it imposes a yielding load on the accelerator pedal M, in addition to the return spring 66ª, at the time when the pedal moves to close switch P. The driver will not thus accidentally close switch P at the end of the pedal stroke as a noticeable further effort is required to depress the accelerator for the kickdown final depression of the pedal. When the accelerator is then released the finger 72 operates to open the switch near the fully released position of the accelerator. The parts are so arranged that switch P will be open by finger 72 whenever the accelerator pedal is fully released even under cold starting fast idle setting of the throttle valve under which conditions the throttle valve and accelerator pedal do not return when released quite to the Fig. 3 positions of these parts.

The ignition system J is conventional and includes coil 76, distributor 77, and breaker 78. From the primary side of the coil an ignition grounding line extends by wire 79 through the interrupter switch H thence by wire 80 to a switch R to the terminal 61 for grounding under control of switches N or P at either 62 or 63. The switch R is biased closed by a spring 81 and is opened by some means in response to fully closing the throttle valve Q. Thus at some suitable point in the throttle mechanism there is provided a switch actuator 82 illustrated in the Fig. 3 embodiment as secured to the throttle valve pivot shaft 63 so that, in effect, it extends as an arm of the lever 69. Switch R is so arranged as to close in response to very small opening movement of the throttle valve Q so that unless the throttle valve is fully closed, as in Fig. 3, then switch R is closed.

Any suitable well known thermostatic control may be provided for holding the throttle valve Q open a small amount during cold engine starting conditions and until the engine is sufficiently warmed up to insure against engine stalling when the accelerator pedal is released. One well known means has been diagrammatically illustrated in Fig. 3 wherein the lever 82 is provided with a set screw 82ª which, when the engine is warmed up, engages a fixed stop 82ᵇ to thereby fix the position of the accelerator M in its Fig. 3 fully released position and the throttle valve Q in its Fig. 3 fully closed position for normal engine idling. A thermostat S is located where it will be subjected to warm up engine temperature, as is well known, this thermostat having an operated member 82ᶜ so disposed that when the engine is cold this member 82ᶜ will be interposed between the stop 82ᵇ and the set screw 82ª and thus prevent the throttle valve Q from fully closing when the accelerator is released, the latter returning to a position somewhat less than the illustrated Fig. 3 position. When the thermostat S is cold so as to hold the throttle valve Q open for this fast idle condition then, preferably, switch R is maintained closed by its spring 81 under all throttle conditions. However, when the engine is warmed up then thermostat S operates to move the member 82ᶜ to the Fig. 3 position and maintain the same in this position so that the throttle valve may then fully close for normal engine idling upon release of the accelerator pedal M. I desire to point out, however, that my invention in its broader aspects contemplates an arrangement such that switch R will remain open when and only when the accelerator M is released both for normal idle and fast idle engine conditions, such arrangement being readily obtainable by obvious expedients such as providing a gap appropriately greater than that illustrated in Fig. 3 between the fixed and movable contacts of switch R. However, as aforesaid, it will in most instances be preferred to provide the illustrated arrangement of parts or equivalents so as to function to maintain switch R open only when the accelerator is released and only when the engine is operating under approximately normal idle conditions.

In operation with the parts arranged as in Fig. 3 the engine is assumed to have been warmed up and is idling with the accelerator M fully released and the throttle valve Q in its fully closed position thereby opening the kickdown switch P. Transmission C is in neutral and with the vehicle at standstill the governor switch N is closed thus effecting energization of solenoid L to vent motor G to maintain sleeve D released as shown. Interrupter switch H is open as the ball actuator 49 is free of the piston 37.

For an ordinary forward drive, the operator shifts the sleeve E forwardly to high range and by depressing the accelerator pedal the vehicle is driven in third up to any desired speed.

As soon as the accelerator is moved, the switch R is closed, but the ignition is not grounded out at 62 because the switch H is open. At some predetermined speed of vehicle travel, which may be higher than is conventionally practicable without my invention, as for example around 14 miles per hour or higher or lower as desired, governor G operates to open switch N. This de-energizes solenoid L whereupon valve K operates by its spring 56 to open pressure fluid pipe 53 to passage 50. Piston 37 then moves forwardly for its full stroke limited by abutment 43 further compressing springs 45 and 42 and momentarily closing switch H which however does not interrupt the ignition because switch N is open. When the piston is at the end of its forward stroke switch H is open as the ball 49 is then aligned with the piston groove 47.

When piston 37 moves forwardly spring 42 operates to move rod 38 and sleeve D forwardly only until sleeve D comes up to its drive blocked position where it remains until the driver releases the accelerator pedal for the upshift to fourth by allowing the engine to slow down sufficiently to synchronize the speeds of teeth 14 and sleeve D and to effect unblocking action of the blocker 16. The drive then takes place in the cruising fourth or direct drive.

Downshift from fourth back to third is effected either by closing the kickdown switch P or by closing governor switch N. Thus when the driver desires to effect the downshift from fourth he fully depresses the accelerator M to close switch P and inasmuch as the engine is delivering its full power at the attendant wide open throttle, it is desired to effect torque relief at the teeth 14, 16 to facilitate the release of sleeve D for the downshift. Therefore, when switch P is closed this not only energizes solenoid L to vent motor G but also coincidentally affords a ground for the ignition wire 80 as soon as switch H is closed. When motor G is vented, piston 37 moves rearwardly a small amount independently of sleeve D under the force of spring 45 in taking up the aforesaid gap until the piston engages the rod shoulder 46. When the piston moves to take up the gap, cam 48 closes the switch H to interrupt the ignition system J at ground 63 as switches P and R are then closed. This instantly unloads the torque at the teeth of sleeve D whereupon the piston 37 completes its rearward or return stroke back to the Fig. 3 position moving with it, because of shoulder 46, the rod 38 and sleeve D as a unit. As soon as the sleeve clears the teeth 14 the ignition is restored to normal operation because ball 49 clears the cam 48. When the accelerator M is released then fourth is again restored as aforesaid provided the vehicle speed is still such that switch N is open. If desired, any well known form of upper limit control on the accelerator kickdown may be provided so that, above a predetermined relatively high vehicle speed, the accelerator downshift is rendered inoperative.

For the other downshift from fourth to third under control of the vehicle speed it is only necessary to reduce the vehicle speed to or below the speed at which governor switch N closes. This energizes solenoid L and motor G effects the downshift just as outlined in connection with the closing of kickdown switch P except that when bringing the car to rest with the accelerator pedal released such downshift is not attended by ignition interruption because, although switch H closes momentarily, there is no ground for the wire 81 because switch R is open. By providing a kickdown spring 45 of sufficient strength, the sleeve D will release in response to opening of governor switch N because at such time the sleeve teeth are under relatively small coasting torque of the engine. If the engine is under substantial driving torque with the throttle Q open at the time switch N closes, as will occur when pulling up a steep grade during which the car speed may drop sufficiently to close switch N, then such driving torque will be relieved by momentary ignition interruption when the motor G is vented because piston 37 will close switch H in taking up the gap at shoulder 46 and switches R and N are closed thereby providing a ground at 62 for the grounding lines 79, 80.

Even if my invention is incorporated in a system in which the spring 45 is not strong enough to effect immediate disengagement of sleeve D when governor switch N closes in slowing down the car with the accelerator released, the sleeve D will be released at the instant that the coast torque is changed to drive torque, as by depressing the accelerator slightly, or when the car further slows down in coming to a stop to a point where the diminishing coast load on the sleeve teeth is overcome by the force of spring 45. Such a downshift is attained smoothly without tendency to stall the engine. By preference the latter spring is of such force that it will overcome such coast torque at the time that governor switch N closes when the car speed slows down under released accelerator conditions thereby providing a smooth non-lurching step-down in the transmission without ignition interruption and free from tendency for the engine to stall.

However, my invention provides for automatically accompanying the downshift with torque relief such as ignition interruption under conditions when desirable to unload the torque at the teeth of sleeve D as when the throttle valve Q is not fully closed. Under such conditions the engine will not tend to stall and torque relief is desirable as an incident to downshift because of the substantial torque load on the teeth of sleeve D. One such instance has been hereinbefore referred to as when the downshift is called for by closing of the governor switch N when the throttle valve is open, as in climbing a grade. Another such instance occurs when the engine is cold, it having been assumed in the foregoing outline of operation that the engine was warmed up for normal idling speed.

When the engine is cold, as when starting out in cold weather, the usual thermostatic throttle opening device S operates as aforesaid to maintain the throttle valve Q open, when the accelerator M is released, sufficiently to maintain a fast idle to prevent engine stalling. When operating under such conditions the switch R is closed at all times, assuming that it is desired to employ this phase of my invention, and therefore the downshift from fourth to third by closing of governor switch N will be accompanied by momentary ignition interruption when switch H closes to ground the wire 80 at 62. This insures torque relief at a time of appreciable engine torque on the teeth of sleeve D. Of course, when the engine is warmed up sufficiently to permit the throttle valve to fully close then the switch R is held open at closed throttle conditions and the governor directed downshift will occur without ignition interruption.

When the clutch E is in its rearward low range position, then the upshift and downshift under control of sleeve D will be just as set forth in connection with the corresponding functions occurring for the high range setting. However, if governor O is driven from the countershaft, as at 60 in Fig. 2, then the governor O will function at somewhat lower car speeds depending on the gear ratios for first and second compared with third and fourth as will be readily understood.

Figure 4:
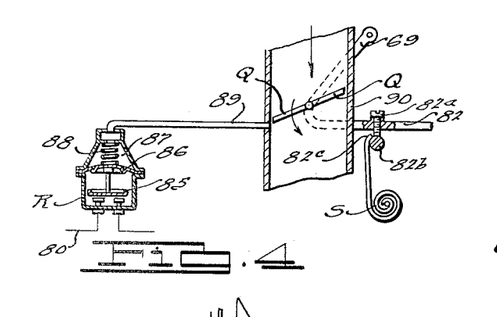
Fig. 4 is a detail sectional view illustrating a modification of my invention which may be adapted to the Fig. 3 system.

In Fig. 4, I have illustrated a modified arrangement for operating the switch R of Fig. 3. The switch movable element 85 is now carried by a differential pressure operated element such as the diaphragm 86 exposed to a chamber 87 and biased by a spring 88 to normally hold the switch R closed. Chamber 87 communicates by a pipe 89 with the carburetor intake riser 90 which, as in Fig. 3, is the commercial downdraft type. The pipe 89 is so located as to be open to the engine or downstream side of the throttle valve Q when the latter is fully closed whereby the resulting high suction will operate on diaphragm 86 to open switch R. However, as soon as the throttle valve is opened, even a small amount and including its fast idle position for a cold engine as aforesaid, then with the pipe 89 disposed in relation to the throttle valve Q as illustrated in Fig. 4 the suction in pipe 89 will drop materially and switch R will close and remain closed for all further throttle opening positions regardless of the speed and load on the engine. Obviously, if desired, pipe 89 may be lowered slightly in relation to the closed throttle valve Q so that switch R will remain open until valve Q opens just beyond its fast engine idle position. Except for the pipe 89 and the suction control for switch R the Fig. 4 arrangement is identical with that in Fig. 3 and is intended to replace the switch R of Fig. 3 in the ignition grounding line between wire 80 and terminal 61. Hence the Fig. 4 switch will function in the system just as set forth in connection with the switch R of Fig. 3. The Fig. 4 switch has the advantage, however, of not loading the accelerator pedal return spring by the switch closing spring, it being apparent that in Fig. 4 there is no additional load imposed on the accelerator as an incident to operation of switch R. Furthermore, this switch is very sensitive in its opening and closing movements to very slight movements of the throttle valve in the vicinity of its fully closed position.

Figure 5:
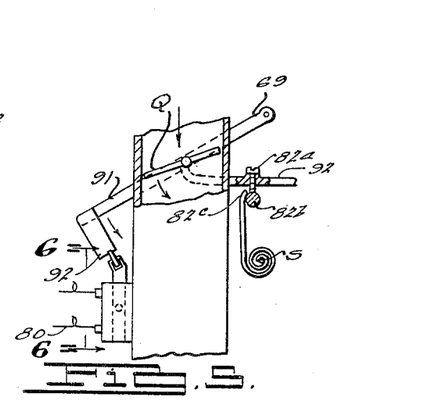
Fig. 5 is a fragmentary elevational view of a further modification of my invention which may likewise be adapted to the Fig. 3 system.
Figure 6:
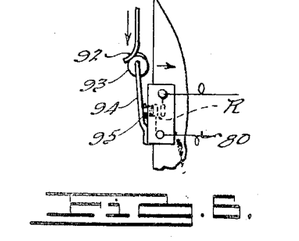
Fig. 6 is a detail view of the Fig. 5 mechanism taken as indicated by line 6—6 of Fig. 5.

In Figs. 5 and 6, I have illustrated a further modification illustrating a mechanical switch operation which, however, does not load the accelerator return spring when the accelerator is fully released and the throttle closed. The throttle operating lever 69 has an extension 91 carrying a cam member 92 engaged by a roller 93 on the end of a spring arm 94 in position to engage the plunger operator 95 for closing switch R. When the throttle valve Q is fully closed, then cam 92 unloads arm 94 by allowing the roller 93 to move outwardly thereby allowing switch R to open. However, any slight throttle opening, including the fast idle adjustment of the throttle, with the parts arranged as illustrated, will cause cam 92 to move roller 93 such that arm 94 will close switch R. Here again the parts may obviously be arranged if desired such that switch R will remain open only for both normal and fast idle engine conditions. Thus by substituting this switch for the switch R in the Fig. 3 system it will function just as aforesaid but with the further advantage, as in Fig. 4, of not further loading the accelerator return spring at the accelerator released position when the throttle valve is closed.

It will be apparent that in each embodiment of my invention I have provided control means for the switch R so constructed and arranged as to selectively render the torque unloading means either inoperative or operative when the engine is running and in response respectively to positioning of the throttle valve Q either in its closed position or an open position of any appreciable extent preferably including the automatic fast idle setting. Normal operating condition of the engine, as used in my specification and claims, refers to the condition of operation after the engine has been warmed up either by reason of its own operation or by reason of the surrounding atmospheric temperature such that the temperature responsive fast idle control S, when employed, is inoperative to hold the throttle valve partially open when the accelerator has been released. Prior to the warmed up engine condition the engine may be referred to as being "cold" which means that the thermo-control S is operating to maintain the fast idle condition.

It will be apparent that my torque unloading control system leaves the accelerator step-down transmission control free to operate accompanied by torque unloading and that the speed responsive means also directs the step-down with torque unloading when the engine is delivering appreciable torque under less than closed throttle conditions with the accelerator released. However, when the engine is operating normally then the torque relief is automatically rendered inoperative for the speed responsive directed step-down but is automatically rendered effective for the accelerator downshift.

I claim:

1. In a drive for a motor vehicle having an engine, transmission mechanism operable to provide a speed ratio drive from the engine to the vehicle, said mechanism including positively interengageable drive control elements cooperable for relative engagement to render said drive effective and for relative disengagement to release said drive, said elements when relatively engaged being subjected to thrust therebetween during said drive so as to resist their relative disengagement, an ignition system for said engine adapted to be interrupted to relieve said thrust thereby to facilitate said relative disengagement of said elements, a control member movable between two predetermined positions thereof for controlling relative disengagement of said elements, means operable in response to movement of said control member from one toward the other of its said positions for effecting relative disengaging bias of said elements, means operable in response to said movement of said control member toward its said other position for effecting interruption of said ignition system, a throttle valve for said engine, means operable under control of the vehicle driver for effecting adjustment of said throttle valve between closed and open positions thereof, switch means operable to selectively render said ignition interrupting means either effective or ineffective to interrupt said ignition system when said control member moves as aforesaid toward its said other position, and means operating when said engine is operating and as an incident to adjusting said throttle valve between its closed position and an open position to effect said selective operation of said switch means.

2. In a drive for a motor vehicle having an engine, transmission mechanism operable to provide a speed ratio drive from the engine to the vehicle, said mechanism including positively interengageable drive control elements cooperable for relative engagement to render said drive effective and for relative disengagement to release said drive, said elements when relatively engaged being subjected to thrust therebetween during said drive so as to resist their relative disengagement, torque relief means operable to relieve said thrust thereby to facilitate said relative disengagement of said elements, a control member movable between two predetermined positions thereof for controlling relative disengagement of said elements, means operable in response to movement of said control member from one toward the other of its said positions for effecting relative disengaging bias of said elements, means operable in response to said movement of said control member toward its said other position for effecting operation of said torque relief means, a throttle valve for said engine, means operable under control of the vehicle driver for effecting adjustment of said throttle valve between closed and open positions thereof, switch means operable to selectively render said torque relief means either operable or inoperable when said control member moves as aforesaid toward its said other position, and means operating when said engine is operating and as an incident to adjusting said throttle valve between its closed position and an open position to effect said selective operation of said switch means.

3. In a drive for a motor vehicle having an engine, transmission mechanism operable to provide a speed ratio drive from the engine to the vehicle, said mechanism including positively interengageable drive control elements cooperable for relative engagement to render said drive effective and for relative disengagement to release said drive, said elements when relatively engaged being subjected to thrust therebetween during said drive so as to resist their relative disengagement, an ignition system for said engine adapted to be interrupted to relieve said thrust thereby to facilitate said relative disengagement of said elements, a control member movable between two predetermined positions thereof for controlling relative disengagement of said elements, means operable in response to movement of said control member from one toward the other of its said positions for effecting relative disengaging bias of said elements, means operable in response to said movement of said control member toward its said other position for effecting interruption of said ignition system, a throttle valve for said engine, means operable under control of the vehicle driver for effecting adjustment of said throttle valve between closed and open positions thereof, a switch operable between open and closed positions to selectively render said ignition interrupting means either effective or ineffective to interrupt said ignition system when said control member moves as aforesaid toward its said other position, means operating in response to adjustment of said throttle valve to its closed position, when said engine is operating, for so controlling said switch as to effect operation thereof to one of its said positions, and means operating in response to adjustment of said throttle valve in throttle opening direction from its said closed position, when said engine is operating, for so controlling said switch as to effect operation thereof to the other of its said positions.

4. In a drive for a motor vehicle having an engine, transmission mechanism operable to provide a speed ratio drive from the engine to the vehicle, said mechanism including positively interengageable drive control elements cooperable for relative engagement to render said drive effective and for relative disengagement to release said drive, said elements when relatively engaged being subjected to thrust therebetween during said drive so as to resist their relative disengagement, torque relief means operable to relieve said thrust thereby to facilitate said relative disengagement of said elements, a control member movable between two predetermined positions thereof for controlling relative disengagement of said elements, means operable in response to movement of said control member from one toward the other of its said positions for effecting relative disengaging bias of said elements, means operable in response to said movement of said control member toward its said other position for effecting operation of said torque relief means, a throttle valve for said engine, means operable under control of the vehicle driver for effecting adjustment of said throttle valve between closed and open positions thereof, a switch operable between open and closed positions to selectively render said torque relief means either operable or inoperable when said control member moves as aforesaid toward its said other position, means operating in response to adjustment of said throttle valve to its closed position, when said engine is operating, for so controlling said switch as to effect operation thereof to one of its said positions, and means operating in response to adjustment of said throttle valve in throttle opening direction from its said closed position, when said engine is operating, for so controlling said switch as to effect operation thereof to the other of its said positions.

5. In a drive for a motor vehicle having an engine, transmission mechanism operable to provide a speed ratio drive from the engine to the vehicle, said mechanism including positively interengageable drive control elements cooperable for relative engagement to render said drive effective and for relative disengagement to release said drive, said elements when relatively engaged being subjected to thrust therebetween during said drive so as to resist their relative disengagement, an ignition system for said engine adapted to be interrupted to relieve said thrust thereby to facilitate said relative disengagement of said elements, a control member movable between two predetermined positions thereof for controlling relative disengagement of said elements, means operable in response to movement of said control member from one toward the other of its said positions for effecting relative disengaging bias of said elements, means operable in response to said movement of said control member toward its said other position for effecting interruption of said ignition system, a throttle valve for said engine, a driver operable throttle valve controlling element, means for effecting operation of said throttle valve in response to operation of said throttle controlling element such that, after said engine has been warmed up for normal operation thereof, movement of said throttle controlling element in one direction effects opening movement of said throttle valve and movement of said throttle controlling element to a predetermined position in the opposite direction causes said throttle valve to close, temperature controlled means operating to limit closing movement of said throttle valve beyond a predetermined open throttle valve position thereby to prevent said throttle valve from moving to its closed position as aforesaid until said engine has been warmed up as aforesaid, switch means operable to selectively render said ignition interrupting means either effective or ineffective to interrupt said ignition system when said control member moves as aforesaid toward its said other position, and means operating, when said engine is operating, to effect said selective operation of said switch means in response to movement of said throttle valve between its said predetermined open position and its said closed position.

6. In a drive for a motor vehicle having an engine, transmission mechanism operable to provide a speed ratio drive from the engine to the vehicle, said mechanism including positively interengageable drive control elements cooperable for relative engagement to render said drive effective and for relative disengagement to release said drive, said elements when relatively engaged being subjected to thrust therebetween during said drive so as to resist their relative disengagement, an ignition system for said engine adapted to be interrupted to relieve said thrust thereby to facilitate said relative disengagement of said elements, a control member movable between two predetermined positions thereof for controlling relative disengagement of said elements, means operable in response to movement of said control member from one toward the other of its said positions for effecting relative disengaging bias of said elements, means operable in response to said movement of said control member toward its said other position for effecting interruption of said ignition system, a throttle valve for said engine, throttle valve operating means including a driver operable accelerator pedal so constructed and arranged that depression of said pedal will effect opening movement of said throttle valve and release thereof will, when said engine has been warmed up for normal operation, effect movement of said throttle valve to its closed position thereby to provide idling of said engine at a relatively slow speed, temperature controlled means operating, until said engine has been warmed up as aforesaid, to hold said throttle valve in a predetermined open position when said pedal is released thereby to provide idling of said engine at a relatively fast speed, and means operating, when said engine is operating, to selectively render said ignition interrupting means either effective or ineffective to interrupt said ignition system when said control member moves as aforesaid toward its said other position and in response to movement of said throttle valve between its said positions providing relatively fast and relatively slow engine idling speeds.

7. In a drive for a motor vehicle having an engine, transmission mechanism operable to provide a speed ratio drive from the engine to the vehicle, said mechanism including positively interengageable drive control elements cooperable for relative engagement to render said drive effective and for relative disengagement to release said drive, said elements when relatively engaged being subject to thrust therebetween during said drive so as to resist their relative disengagement, an ignition system for said engine adapted to be interrupted to relieve said thrust thereby to facilitate said relative disengagement of said elements, a vehicle speed responsive switch comprising a switch control part movable between two predetermined positions thereof for controlling relative disengagement of said elements, means operable in response to movement of said speed responsive switch part from one to the other of its said positions for effecting relative disengaging bias of said elements, means including said speed responsive switch for effecting interruption of said ignition system, a throttle valve for said engine, means operable under control of the vehicle driver for effecting adjustment of said throttle valve between closed and open positions thereof, and means operating in response to adjustment of said throttle valve between its said positions, when said engine is operating, for selectively rendering said ignition interrupting means either effective or ineffective to interrupt said ignition system when said speed responsive switch part is moved to its said other position.

8. In a drive for a motor vehicle having an engine, transmission mechanism operable to provide a speed ratio drive from the engine to the vehicle, said mechanism including positively interengageable drive control elements cooperable for relative engagement to render said drive effective and for relative disengagement to release said drive, said elements when relatively engaged being subjected to thrust therebetween during said drive so as to resist their relative disengagement, an ignition system for said engine adapted to be interrupted to relieve said thrust thereby to facilitate said relative disengagement of said elements, a vehicle speed responsive switch comprising a switch control part movable between two predetermined positions thereof for controlling relative disengagement of said elements, means operable in response to movement of said speed responsive switch part from one to the other of its said positions for effecting relative disengaging bias of said elements, means including said speed responsive switch for effecting interruption of said ignition system, a throttle valve for said engine, means operable under control of the vehicle driver for effecting adjustment of said throttle valve between closed and open positions thereof, means operable in response to operation of said throttle adjusting means in throttle opening direction for effecting relative disengaging bias of said elements accompanied by interruption of said ignition system, switch means operable, when said engine is operating, between open and closed positions to selectively render said ignition interrupting means either effective or ineffective to interrupt said ignition system when said speed responsive switch part is moved to its said other position, and means for effecting said operation of said switch means in response to adjustment of said throttle valve between its said positions when said engine is operating.

9. In a drive for a motor vehicle of the type having an engine provided with an ignition system and a throttle valve adapted to be adjusted between closed and open positions thereof, transmission mechanism comprising change speed means operable to effect step-up and step-down change in the speed ratio drive setting of the transmission mechanism, a movable control member, transmission control means operating in response to predetermined movement of said control member for effecting step-down by said change speed means, ignition control means operating as an incident to said predetermined movement of said control member for interrupting said ignition system, and means operating as an incident to adjustment of said throttle valve between its said positions, when said engine is operating, for selectively rendering said ignition control means either operative or inoperative.

10. In a drive for a motor vehicle of the type having an engine provided with an ignition system and a throttle valve adapted to be adjusted between closed and open positions thereof, transmission mechanism comprising change speed means operable to effect step-up and step-down change in the speed ratio drive setting of the transmission mechanism, a movable control member, transmission control means operating in response to predetermined movement of said control member for effecting step-down by said change speed means, ignition control means operating as an incident to said predetermined movement of said control member when said throttle valve is in an open position for interrupting said ignition system, and means effective in response to adjustment of said throttle valve to its closed position, when said engine is operating, for rendering said ignition control means inoperative to effect interruption of said igniton system.

11. In a drive for a motor vehicle of the type having an engine provided with an ignition system and a throttle valve adapted to be adjusted between closed and open positions thereof, transmission mechanism comprising change speed means operable to effect step-up and step-down change in the speed ratio drive setting of the transmission mechanism, a movable control member, transmission control means operating in response to predetermined movement of said control member for effecting step-down by said change speed means, temperature responsive means automatically operating to prevent throttle valve closing beyond a predetermined open throttle valve position when said engine is cold thereby to provide a relatively fast idle for said engine and to permit said throttle valve to close when said engine is warmed up thereby to provide a relatively slow idle for said engine, ignition control means, including a switch, operating as an incident to said predetermined movement of said control member when said throttle valve is closed and the engine is operating for rendering said ignition control means inoperative to interrupt said ignition system, and means operating as an incident to operation of said temperature responsive means in providing said relatively fast idle for effecting an operation of said switch when the engine is operating thereby to render said ignition control means operative to interrupt said ignition system.

12. In a drive for a motor vehicle of the type having an engine provided with an ignition system and a throttle valve adapted to be adjusted between closed and open positions thereof, transmission mechanism comprising change speed means operable to effect step-up and step-down change in the speed ratio drive setting of the transmission mechanism, vehicle speed responsive means including a switch member movable between predetermined positions of control, transmission control means operating in response to movement of said switch member to one of its said positions of control for effecting step-down by said change speed means, ignition control means operating as an incident to movement of said switch member to its said one position for effecting interruption of said ignition system, and means controlled by predetermined positioning of said throttle valve when the engine is operating for overruling said operation of said ignition control means.

13. In a drive for a motor vehicle of the type having an engine provided with a throttle, an accelerator for controlling said throttle such that said engine is automatically conditioned upon release of the accelerator for relatively slow and fast speed idle operations in response to engine temperature change, change speed transmission means including means operable to effect a down-shift therein, means operable for unloading torque in said transmission means to facilitate said down-shift, means operating in response to predetermined movement of the accelerator in throttle opening direction for effecting said operation of said down-shift accompanied by said operation of said torque unloading means when said engine is conditioned for either said relatively slow or fast idle conditions, vehicle speed responsive means, means controlled by said speed responsive means and automatically operating, as an incident to bringing the vehicle to rest when the accelerator is released, for effecting said operation of said down-shift accompanied by said operation of said torque unloading means, and means for so controlling said torque unloading means as to (1) render the same inoperative as an accompaniment to said speed responsive controlled down-shift when said engine is conditioned for said relatively slow idle operation as aforesaid and (2) to render the same operative as aforesaid to accompany said speed responsive controlled down-shift when said engine is conditioned for said relatively fast idle operation.

14. In a drive for a motor vehicle of the type having an engine provided with a throttle, an accelerator for controlling said throttle such that said engine is automatically conditioned upon release of the accelerator for relatively slow and fast speed idle operations in response to engine temperature change, change speed transmission means including means operable to effect a down-shift therein, means operable for unloading torque in said transmission means to facilitate said downshift, vehicle speed responsive means, means controlled by said speed responsive means and automatically operating, as an incident to bringing the vehicle to rest when the accelerator is released, for effecting said operation of said downshift accompanied by said operation of said torque unloading means, and means for so controlling said torque unloading means as to (1) render the same inoperative as an accompaniment to said speed responsive controlled downshift when said engine is conditioned for said relatively slow idle operation as aforesaid and (2) to render the same operative as aforesaid to accompany said speed responsive controlled downshift when said engine is conditioned for said relatively fast idle operation.

15. In a motor vehicle drive of the type having an engine, a throttle operable between open and closed position for controlling said engine, change speed transmission means including means operable under predetermined conditions to effect a downshift therein, temperature responsive means for releasably blocking said throttle against closing, means operable when said throttle is blocked as aforesaid to unload torque in said transmission means to facilitate said downshift, and control means effective as an incident to throttle closing when said engine is operating for rendering said torque unloading means inoperative.

16. In a motor vehicle drive of the type having an engine, a throttle operable between open and closed position for controlling said engine, change speed transmission means including means operable under predetermined conditions to effect a downshift therein, means operable as an incident to operation of said downshift means to unload torque in said transmission means to facilitate said downshift, and engine suction operated control means effective as an incident to throttle closing for rendering said torque unloading means inoperative during operation of said downshift means.

17. In a motor vehicle drive of the type having an engine, a throttle operable between open and closed position for controlling said engine, change speed transmission means including means operable under predetermined conditions to effect a downshift therein, temperature responsive means for releasably blocking said throttle against closing, means operable when said throttle is blocked as aforesaid to unload torque in said transmission means to facilitate said downshift, and engine intake suction operated control means effective as an incident to throttle closing for rendering said torque unloading means inoperative.

18. In a motor vehicle drive of the type having an engine, a throttle operable between open and closed position for controlling said engine, change speed transmission means including means operable under predetermined conditions to effect a downshift therein, means operable to unload torque in said transmission to facilitate said downshift, means biasing said throttle to its closed position, and control means effective as an incident to throttle closing for rendering said torque unloading means inoperative, said control means comprising a switch, and means providing an operative connection between said switch and throttle so constructed and arranged as to transmit force of said biasing means for operating said switch during throttle closing and thereafter, when said throttle is closed, to maintain said switch operated as aforesaid substantially independently of said biasing means.

19. In a motor vehicle drive of the type having an engine intake passage provided with a throttle valve adjustably disposed therein for movement from a closed throttle position of substantially closing said passage to a plurality of open throttle positions, speed ratio transmission means, control means for said transmission means including a control element movable between two positions of control, means biasing said control element to one of its said positions, a suction responsive element for moving said control element to the other of its said positions, and a suction conduit between said suction responsive element and said intake passage having an opening to said passage on the engine side of said throttle valve in contiguous relationship with said throttle valve when in its said closed position, said biasing means, suction responsive element, and said throttle valve and conduit opening being so constructed and arranged in relationship with each other that said biasing means operates to move said control element to its said position and maintain the same in such position when said throttle valve is adjusted between substantially all of its said open throttle positions and that the suction in said intake passage will effect operation of said suction responsive element to effect movement of said control element to its said other position in opposition to said biasing means when said throttle valve is adjusted to its said closed throttle position.

20. In a motor vehicle drive of the type having a movable throttle device; a driver operable control member adapted to be operated and released for effecting controlling movements of said throttle devices; change speed transmission means; means operable to unload torque in said change speed transmission means to facilitate downshift therein; said change speed transmission means including means operating, in response to bringing the vehicle to rest under predetermined conditions with said driver operable control member released, to effect said downshift accompanied by operation of said torque unloading means when the engine is operating in its cold condition; and control means responsive to normal engine operating condition for preventing the aforesaid operation of said torque unloading means when the vehicle is brought to rest as aforesaid with said driver operable control member released.

21. In a motor vehicle drive of the type having a movable throttle device; a driver operable control member adapted to be operated and released for effecting controlling movements of said throttle device; change speed transmission means; means operable to unload torque in said change speed transmission means to facilitate downshift therein; said change speed transmission means including means operating, in response to bringing the vehicle to rest under predetermined conditions with said driver operable control member operated to a predetermined position thereof, to effect said downshift accompanied by operation of said torque unloading means; and control means operating in response to release movement of said driver operable control member from its aforesaid predetermined position for rendering said torque unloading means inoperative during said downshift.

22. In a motor vehicle drive of the type having an engine; throttling control means for said engine adapted to be operated and released to vary the engine output; change speed transmission means including means operable under predetermined conditions to effect downshift therein; means operable as an incident to operation of said downshift means to unload torque in said transmission means to facilitate said downshift; a switch adapted for movements between open and closed positions for so controlling operation of said torque unloading means as to render the latter operable or inoperable during operation of said downshift means; and means providing a switch-operating connection between said throttling control means and said switch for effecting said movements in response to said operation and release of said throttling control means.

LOUIS B. FORMAN.

REFERENCES CITED

The following references are of record in the file of this patent:

UNITED STATES PATENTS

| Number | Name | Date |
|---|---|---|
| 2,051,553 | Fleischel | Aug. 18, 1936 |
| 2,281,916 | Claytor | May 5, 1942 |
| 2,314,570 | Ball | Mar. 23, 1943 |
| 2,328,291 | Osborne | Aug. 31, 1943 |
| 2,333,668 | Neracher et al. | Nov. 9, 1943 |
| 2,348,763 | Syrovy et al. | May 16, 1944 |
| 2,440,055 | Matulaitis | Apr. 20, 1948 |